H. SILVERMAN.
AUTOMOBILE SIGNAL.
APPLICATION FILED NOV. 23, 1915.
1,292,655. Patented Jan. 28, 1919.
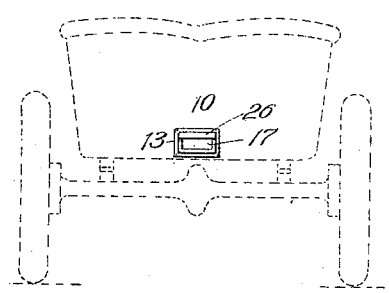
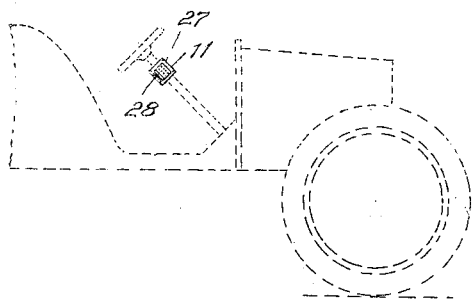
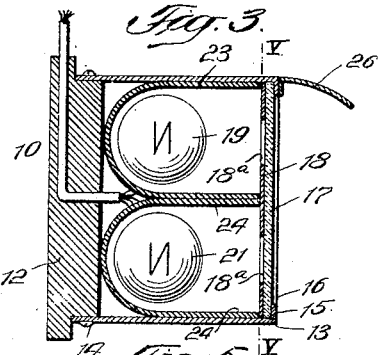
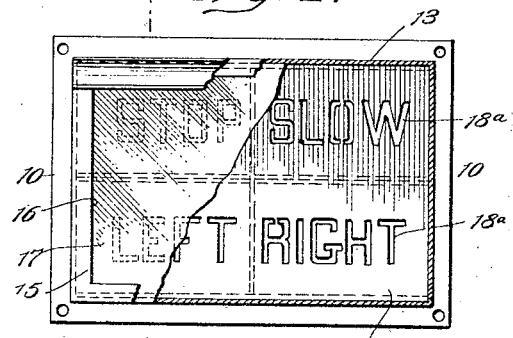
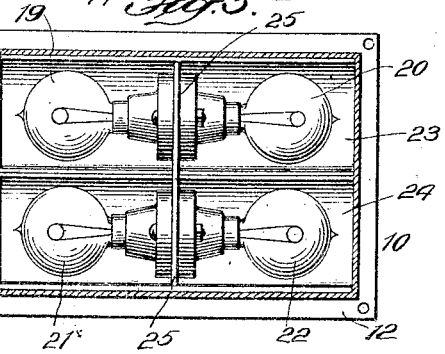
Inventor
H. Silverman,
By his Attorneys

UNITED STATES PATENT OFFICE.

HERMAN SILVERMAN, OF NEW YORK, N. Y.

AUTOMOBILE-SIGNAL.

1,292,655.  Specification of Letters Patent.  Patented Jan. 28, 1919.

Application filed November 23, 1915. Serial No. 63,004.

*To all whom it may concern:*

Be it known that I, HERMAN SILVERMAN, a subject of the Czar of Russia, and a resident of New York, county and State of New York, have invented certain new and useful Improvements in Automobile-Signals, of which the following is a full, clear, and exact description.

This invention relates more particularly to a signal for power-driven vehicles, and is intended as a notice to the drivers of other vehicles.

One of the principal objects of the invention is to provide simple and efficient means under the control of the driver of a motor-driven vehicle by which the driver may through electrically controlled means flash a signal such as "Stop", "Slow", "Left", "Right" or any other signal at a point convenient for the driver of a vehicle in the rear to see, thus avoiding the necessity for a person in a vehicle to place his hand and arm beyond one side thereof which often results in injury to the person as well as the liability of losing control of the vehicle while attempting to operate the steering wheel with one hand.

Another object of the invention is to provide a simple and efficient attachment for the rear of a vehicle by which lights may be made to show characters indicating a signal or a plurality of signals.

A further object of the invention is to provide simple and efficient means whereby the driver of the vehicle may know whether or not the signal at the rear thereof has been displayed.

A still further object of the invention is to provide simple and efficient electric signaling means which may be readily made and assembled and which may be easily applied to vehicles of various constructions.

With these and other objects in view, the invention will be hereinafter more particularly described with reference to the accompanying drawings, which form a part of this application, and will then be pointed out in the claim at the end of the description.

In the drawings, Figure 1 shows in dotted lines a rear elevation of one form of vehicle with the signaling part of the invention applied thereto.

Fig. 2 is a fragmentary side elevation of the vehicle showing the operating means for the signal and one of the positions where the operating or controlling means may be placed.

Fig. 3 is an enlarged vertical section taken on the line III—III of Fig. 4, of the signaling device, box or case.

Fig. 4 is a front view, partly broken away and partly in section, of the device shown in Fig. 3.

Fig. 5 is a section taken on the line V—V of Fig. 3.

Fig. 6 is an enlarged front elevation of the control end of the signaling means; and Fig. 7 is a diagrammatic view showing the electric circuit of the various parts.

While the invention is shown as applied particularly to an automobile, it is to be understood that the invention may be employed for various purposes, and that some of the parts may be dispensed with or others substituted therefor without departing from the nature of the invention.

The invention comprises primarily a signaling device 10 and an operating or controlling device 11. The controlling device may be placed on the steering post of the vehicle or in any other suitable location convenient for a person to manipulate, and the signaling device 10 may be located at the rear of the vehicle or in any other convenient position where a person in a vehicle following may readily see the same. The signaling device 10 is electrically controlled, as will be presently described, through the device 11, to flash a signal or make a signal appear on the face of said device at the will of a person in the vehicle, and this signal may be formed as words or a series of words, any one or more of which may be made to appear or disappear as occasion requires.

The device 10 comprises a base 12 which may be rectangular in form or of any other desired shape, and held to said base is a box-like body or member 13. The box-like member 13 may be secured to the base 12 by means of screws 14 or otherwise, and said base 12 may be secured in any desired way in a convenient position to the rear of the vehicle. The forward edge of the casing or member 13 is provided with an inwardly turned part or flange 15 extending around the same so as to leave an open space, as 16, slightly less than the size of the case or member 13 and of substantially the same form. At the rear of the flange 15 and within the casing 13 is a plate-like translucent member or body 17 of colored glass or other material, and immediately back of said member 17 is a member 18 of sheet metal or other material. In the member 18 are arranged characters, as 18, which are formed by cutting openings, holes or otherwise, in the member 18, and these characters may indicate words as "Stop", "Slow", "Danger", "Left", "Right" or any other suitable words or characters. At the rear of the member 18 are lamps 19, 20, 21 and 22. These lamps are arranged within pockets corresponding in number to the number of independent words or signals used in connection with the device, and may vary in number according to the requirements and the use to which the invention is put. As shown, there are four different signals representing different moves that the vehicle is to make, and these signals are divided or separated from each other, and each signal is controlled by an independent lamp. A substantially U-shaped member 23 of metal or other material is located above a similar U-shaped member 24, and both of said members 23 and 24 are located within the case 13 and between the base 12 and the character member 18. These members 23 and 24 are divided vertically by a partition 25 or otherwise, and to this partition the base of lamps 19 to 22 are secured in pairs as shown best in Fig. 5, said partition 25 and the members 23 and 24 at their forward edges being made to abut against the character plate 18 to shut out all light communication between the different pockets.

It will be evident that when the light 20 is turned on the word "Slow" will appear while if the light 21 is turned on the word "Left" will appear and so on according to which light is turned on. This word appears as a word in light on the member 17, so that the signal may be seen by a person in another vehicle, there being a shade or hood 26 projecting outwardly from the upper portion of the casing 13 for the purpose of throwing a shadow and somewhat darkening the member 17 in order that the light signal may be seen better in the daytime than might be the case without the use of such a hood or shade.

The operating or controlling device 11 comprises a base or part 27 from which projects a smaller box-like portion 28. In the portion 28 are a plurality of push-button controlled switch devices, as 19ᵃ, 20ᵃ, 21ᵃ, and 22ᵃ. These devices are of a double character and control switches 19ᵇ, 20ᵇ, 21ᵇ, and 22ᵇ, respectively. Each of the devices 19ᵃ to 22ᵃ comprises two push buttons 29 and 30, one of said push buttons being intended to move the switch to close an electric circuit and the other button to move the switch to break the circuit as is usual in the ordinary form of wall switch used in house and other lighting, and as the construction of such switches is not new and is well known, a detailed illustration of the same is thought unnecessary, it being understood that the different push buttons may be differently colored for the different signals or words, or other means employed to be certain that the proper signal is given. In each of the circuits is a miniature electric lamp forming an indicator which shows to the driver of the vehicle that the proper signal has been given. There are four such indicators or indicating means, as 19ᶜ, 20ᶜ, 21ᶜ, and 22ᶜ.

The electric circuit and the means of using the invention are shown best in Fig. 7. The source of supply is indicated at 31 and from the source of supply leads a wire 32 which is connected by short wires 33 to each of the switches from 19ᵇ to 22ᵇ, inclusive. The circuit passes from the switch 19ᵇ when the circuit is closed, through the wire 34, through the indicating lamp 19ᶜ, wire 35, through the lamp 19, then through the wire 36 to the source of supply or to the ground. The circuit for the lamp 20 is through the wire 32, switch 20ᵇ, wire 37, lamp 20ᶜ, wire 38, to the lamp 20, the return being through the wire 36; while for the lamp 21, the circuit is through the switch 21ᵇ, indicator or lamp 21ᶜ, wire 39, and wire 36. The circuit for the lamp 22 is through the wire 32, switch 22ᵇ, wire 40, indicator 22ᵇ, wire 41, through the lamp 22 back to the wire 36, the latter being connected in series to all of the lamps 19 to 22.

It will be seen that when the button, as 29, of any of the devices 19ᵃ to 22ᵃ is pushed to throw the switch to complete the circuit of any one of the lamps, as switch 19ᵇ, for example, to close the circuit, the lamp 19 will be turned on and this will indicate the word "Stop" on the member 17, while a similar operation of any of the other buttons 29 of the devices 19ᵃ to 22ᵃ will correspondingly operate the switches coöperating therewith, and these will turn on different lights, either singly or in groups, according to which device 19ᵃ to 22ᵃ is operated. By operating the buttons 30 of any of the devices 19ᵃ to 22ᵃ, the corresponding switches will be forced to the position shown in Fig. 7 to break the circuit, and this will put out the light so that no signal characters will be shown on the member 17.

From the foregoing it will be evident that simple and efficient means is provided whereby suitable signals may be readily displayed at the rear of a vehicle in such a way that a person in a vehicle following may be warned of the intentions of the driver in the vehicle carrying the signal; that simple and efficient electrical connections are provided; that the signal is under the absolute control of the driver of the vehicle; that the signal is so constructed that it may be used in the daytime as well as at night;

and that said signaling means is simple in construction and may be readily made and assembled.

Having thus described my invention, I claim as new and desire to secure by Letters Patent:—

In a signal box, the combination of a pair of substantially U-shaped members horizontally arranged therein, a vertical partition member dividing each of said U-shaped members into two pockets said partition being arranged substantially midway between the ends of said U-shaped members, and a lamp for each pocket mounted on the vertical partition member to extend horizontally therefrom.

This specification signed this 20th day of November A. D. 1915.

HERMAN SILVERMAN.